US012177505B2

(12) United States Patent
Vishwanath (10) Patent No.: US 12,177,505 B2
(45) Date of Patent: *Dec. 24, 2024

(54) VIDEO STREAMING SYSTEM PRELOADING OF VIDEO CONTENT

(71) Applicant: DISH Network Technologies India Private Limited, Karnataka (IN)

(72) Inventor: Brijesh Vishwanath, Bangalore (IN)

(73) Assignee: DISH Network Technologies India Private Limited (IN)

( * ) Notice: Subject to any disclaimer, the term of this patent is extended or adjusted under 35 U.S.C. 154(b) by 0 days.

This patent is subject to a terminal disclaimer.

(21) Appl. No.: 18/421,612

(22) Filed: Jan. 24, 2024

(65) Prior Publication Data

US 2024/0187677 A1    Jun. 6, 2024

Related U.S. Application Data

(63) Continuation of application No. 17/068,997, filed on Oct. 13, 2020, now Pat. No. 11,924,497.

(51) Int. Cl.
*H04N 21/422* (2011.01)
*H04L 65/612* (2022.01)
*H04L 65/75* (2022.01)

(52) U.S. Cl.
CPC ..... *H04N 21/42222* (2013.01); *H04L 65/612* (2022.05); *H04L 65/75* (2022.05); *H04N 21/42224* (2013.01)

(58) Field of Classification Search
CPC ....... H04N 21/42222; H04N 21/42224; H04N 21/4331; H04N 21/4223; H04L 65/612; H04L 65/75

USPC .......................................... 348/734
See application file for complete search history.

(56) References Cited

U.S. PATENT DOCUMENTS

| | | | |
|---|---|---|---|
| 8,152,642 B2 | 4/2012 | Ergen et al. | |
| 8,698,745 B2 | 4/2014 | Reams | |
| 9,210,355 B2 | 12/2015 | Ergen et al. | |
| 9,237,292 B2* | 1/2016 | Schafer | H04N 21/44222 |
| 10,298,995 B1 | 5/2019 | Stumbo | |
| 2007/0026074 A1 | 11/2007 | Oijer | |
| 2009/0269027 A1* | 10/2009 | Bedingfield, Sr | H04N 21/47202 386/E5.005 |
| 2009/0307092 A1 | 12/2009 | Gugliuzza et al. | |
| 2010/0167646 A1 | 7/2010 | Alameh et al. | |
| 2010/0259144 A1 | 10/2010 | Bevirt et al. | |

(Continued)

*Primary Examiner* — John W Miller
*Assistant Examiner* — Omer Khalid
(74) *Attorney, Agent, or Firm* — KW Law, LLP (57) ABSTRACT

Systems, devices and processes are provided to facilitate the delivery of video content in a video streaming system. Specifically, the various embodiments can provide improved responsiveness by reducing the delay that occurs between when a user acts to initiate video streaming and when the video content is transmitted, received and displayed on a display screen. In general, these embodiments reduce delay by preloading video streaming content in response to detecting particular patterns of movement of a remote control. Specifically, these embodiments monitor for movement of the remote control and determining if a detected movement corresponds to a likely initiation of video streaming. When such movements are detected, the embodiments begin preloading the video streaming content at the video player device.

20 Claims, 6 Drawing Sheets

(56) References Cited

U.S. PATENT DOCUMENTS

2012/0257120 A1\* 10/2012 Nakai ................ H04N 21/4384
                                                                         348/731
2017/0242992 A1    8/2017 Olofsson \* cited by examiner

VIDEO STREAMING SYSTEM PRELOADING OF VIDEO CONTENT

PRIORITY CLAIM

This application is a continuation of U.S. patent application Ser. No. 17/068,997 filed on Oct. 13, 2020, which is incorporated herein by reference.

TECHNICAL FIELD

The following discussion generally relates to video streaming systems. More particularly, the following discussion relates to remote controls for video streaming systems.

BACKGROUND

Media content, including video-on-demand (VOD) and television (TV) programming, has traditionally been delivered to viewers over legacy cable and satellite broadcast systems. More recently, various streaming video platforms have been introduced by media content providers and gained widespread commercial adoption; the term "media content provider," as appearing herein, encompassing all types of media content sources, aggregators, and the like from which content-containing digital or analog signals can be obtained for viewing on user devices. The term "media content providers" thus encompasses cable, satellite, and over-the-top (OTT) TV providers, as well as entities owning or operating streaming video platforms. It is also now commonplace for end users to placeshift media content stored in memory contained in or accessible to a home media receiver, such as a set top box (STB) located at the end user's residence, over a network for viewing on a smartphone, tablet, or other portable media receiver operated by the end user.

There is a long standing desire to improve the user experience for users of such streaming systems. For example, to improve the user experience by improving the responsiveness and reducing delays from the perception of the user. As a specific example, there is a continuing need to reduce the time delay that exists between when a user acts to initiate video streaming and when the video content is first displayed on the display screen. Other desirable features and characteristics will become apparent from the subsequent detailed description and the appended claims, taken in conjunction with the accompanying drawings and this background section.

BRIEF SUMMARY

The various embodiments described herein provide systems, devices and/or processes to improve the delivery of video content in a video streaming system. Specifically, the various embodiments can provide improved responsiveness by reducing the delay that occurs between when a user acts to initiate video streaming and when the video content is transmitted, received and displayed on a display screen.

In general, these embodiments reduce delay by preloading video streaming content in response to detecting particular patterns of movement of a remote control. Specifically, these embodiments monitor for movement of the remote control and determining if a detected movement corresponds to a likely initiation of video streaming. When such movements are detected, the embodiments begin preloading the video streaming content at the video player device. Because this preloading occurs in response to detected movement of the remote control this preloading can begin before a user acts to initiate video streaming (e.g., before a user presses specific button(s) on the remote to initiate streaming). And as such, this preloading can reduce the delay that occurs between the time when a user acts to initiate video streaming and when the video content is transmitted, received and displayed on a display screen.

In one example embodiment, a method is provided that comprises: monitoring to detect movement of a remote control for a media player device; analyzing the detected movement of the remote control to identify possible patterns of movement; determining if at least one of the identified possible patterns of movement that corresponds to an initiation of media streaming has a probability beyond a threshold level; and responsive to determining that at least one of the identified possible patterns of movement that corresponds to the initiation of media streaming has a probability beyond a threshold level, begin preloading of streaming media content at the media player device.

A further example may be implemented wherein the monitoring to detect movement of the remote control for a video player device comprises monitoring movement with an accelerometer on the remote control.

A further example may be implemented wherein the monitoring to detect movement of the remote control for a video player device comprises monitoring movement with a accelerometer on the remote control and a camera on the video player device.

A further example may be implemented wherein the analyzing the detected movement of the remote control to identify possible patterns of movement and the determining if at least one of the identified possible patterns of movement that corresponds to the initiation of video streaming has a probability beyond a threshold level comprises analyzing and determining with a neural network.

A further example may be implemented wherein the identified pattern of movement comprises movement associated with a user picking up the remote control and turning the remote control toward the video player device.

A further example may be implemented wherein the analyzing the detected movement of the remote control to identify possible patterns of movement further comprises determining likelihoods of the identified possible patterns of movement.

A further example may be implemented wherein the preloading of streaming video content to the video player device comprises preloading streaming video based at least in part on a user profile of a user of the video player device.

A further example may be implemented wherein the remote control further includes a fingerprint sensor, and wherein the preloading of streaming video content to the video player device comprises identifying a user with a fingerprint detected at the fingerprint sensor and preloading streaming video based at least in part on a user profile of the identified user.

A further example may be implemented wherein the preloading of streaming video content to the video player device comprises preloading both video data and meta data related to the streaming video content.

In another example embodiment an automated process executable by a video player device in communication with a streaming server over a network is provided, the automated process comprising: monitoring to detect movement of a remote control for the video player device with at least three accelerometers on the remote control; detecting a fingerprint for a user of the remote control with a fingerprint sensor on the remote control; identifying the user based on the detected fingerprint; analyzing the detected movement of the remote control to identify possible patterns of movement and likelihoods of the identified possible patterns of movement; determining if at least one of the identified possible patterns of movement corresponds to movement associated with a user picking up the remote control and turning the remote control toward the video player device to initiate video streaming and has a likelihood beyond a threshold level; and responsive to determining that at least one of the identified possible patterns of movement corresponds to movement associated with a user picking up the remote control and turning the remote control toward the video player device to initiate video streaming and has a likelihood beyond the threshold, begin preloading of streaming video content from the streaming sever to the video player device, where the streaming video content is selected based at least in part on a user profile of the user identified based on the detected fingerprint.

In another embodiment, a video player device in communication with a streaming server over a network, the video player device comprising a processor and a memory, wherein the processor is configured to perform an automated process by executing digital instructions stored in the memory is provided, wherein the automated process comprises: monitoring to detect movement of a remote control for the video player device; analyzing the detected movement of the remote control to identify possible patterns of movement; determining if at least one of the identified possible patterns of movement that corresponds to an initiation of video streaming has a probability beyond a threshold level; and responsive to determining that at least one of the identified possible patterns of movement that corresponds to the initiation of video streaming has a probability beyond the threshold level, begin preloading of streaming video content at the video player device.

Various additional examples, aspects and other features are described in more detail below.

BRIEF DESCRIPTION OF THE DRAWING FIGURES

Exemplary embodiments will hereinafter be described in conjunction with the following drawing figures, wherein like numerals denote like elements, and.

DETAILED DESCRIPTION

The following detailed description of the invention is intended to provide various examples, but it is not intended to limit the invention or the application and uses of the invention. Furthermore, there is no intention to be bound by any theory presented in the preceding background or the following detailed description.

The various embodiments described herein provide systems, devices and/or processes to improve the delivery of video content in a video streaming system. Specifically, the various embodiments can provide improved responsiveness from the perception of user by reducing the delay that occurs between when a user acts to initiate video streaming and when the video content is transmitted, received and displayed on a display screen.

In general, these embodiments reduce delay by preloading video streaming content in response to detecting particular patterns of movement of a remote control. Specifically, these embodiments monitor for movement of the remote control and determining if a detected movement corresponds to a likely initiation of video streaming. When such movements are detected, the embodiments begin preloading the video streaming content at the video player device. Because this preloading occurs in response to detected movement of the remote control this preloading can begin before a user acts to initiate video streaming (e.g., before a user presses specific button(s) on the remote to initiate streaming). And as such, this preloading can reduce the delay that occurs between the time when a user acts to initiate video streaming and when the video content is transmitted, received and displayed on a display screen.

The general concepts described herein may be implemented in any video streaming context, but are especially relevant to the streaming of on demand video programming. Of course, equivalent embodiments could be implemented within other contexts, settings or applications as desired. For example, the concepts can be implemented in the context of streaming live television content and other live programming.

Figure 1:
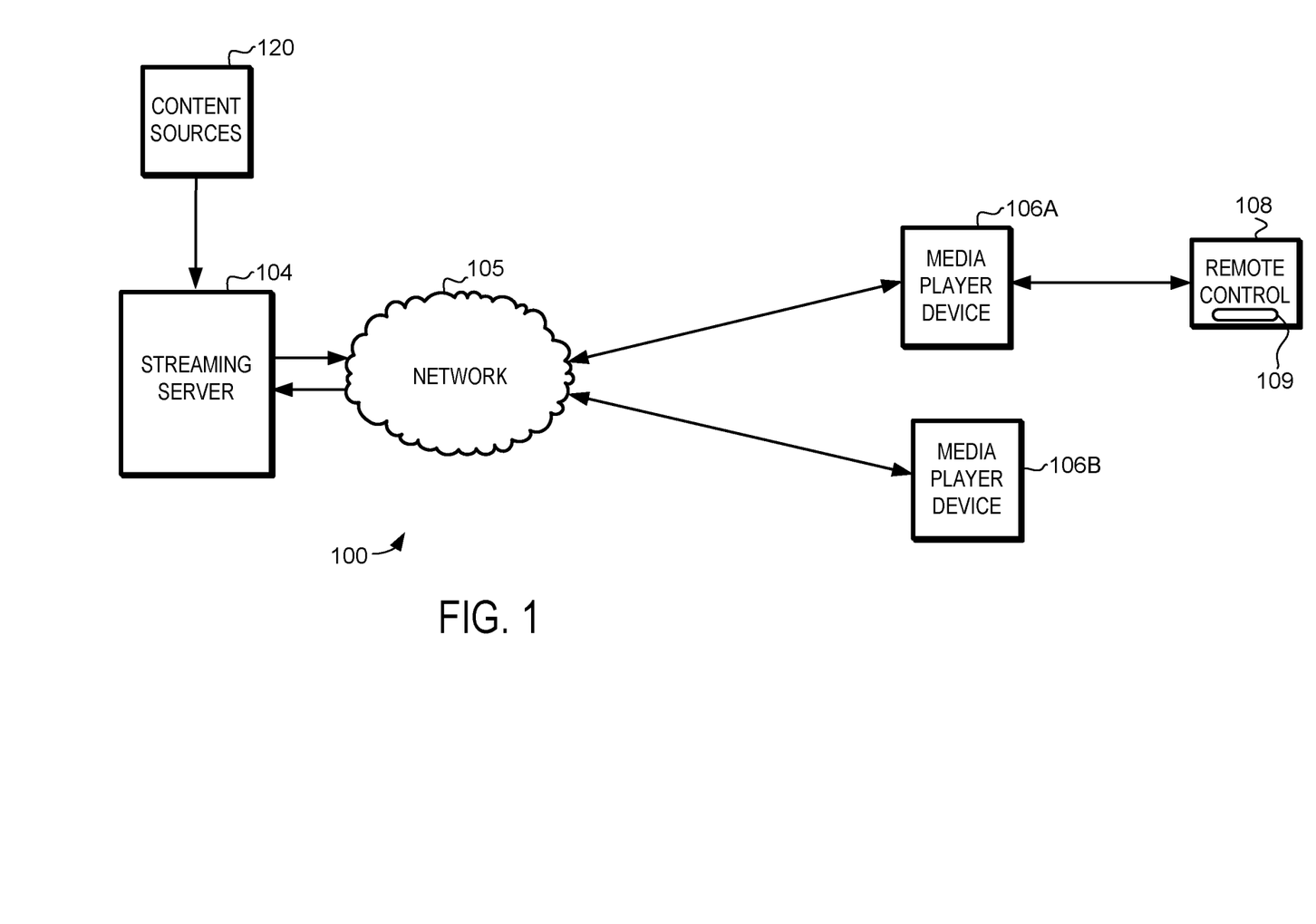
FIG. 1 is a diagram of an example video streaming system that includes a plurality of video player devices.

Turning now to the drawings and with initial reference to FIG. 1, a video streaming system 100 suitably includes a streaming server 104 and a plurality of video player devices 106A-B. At least one of the media player devices 106A-B is configured to operate with a remote control 108. In general, the streaming server 104 receives video content from one or more content sources 120, and transmits that video content through the network 105 to the video player devices 106A-B in the form of a video stream that can be received, processed, and displayed at the video player devices 106A-B.

The content sources 120 can be any type of video content source, including media providers, content aggregators or distributors such as a cable television system operator, a direct broadcast satellite (DBS) system operator, or simply a network service provider or the like. These content sources 120 can provide the video content to the streaming server 104 in any suitable form and by any suitable technique. For example, the video content can be provided via satellite, fiber optic or any other conventional wireless or physical media for transmitting signals. The transmitted signals can be received, demodulated and decoded as needed by any appropriate receiver(s) to extract program signals. The extracted programming signals can then be analyzed as appropriate to identify the program contents. A distributor/aggregator, for example, may encode the extracted signals for distribution on a digital network, for aggregation and redistribution of signals over a DBS or cable distribution system, for generating content stored on a remote storage digital video recorder (RSDVR) or video on demand (VOD) service, or for any other purpose.

This content can then be passed to the streaming server 104. Having received this content, the streaming server 104 can encode the received content into a suitable format streaming to the video player devices 106A-B. For example, the streaming server 104 can transmit an encoded video stream via a content delivery network (CDN) for distribution on network 105 (e.g., the Internet) as part of an RSDVR, VOD or other video streaming service. The video streams are thus transmitted to the video player devices 106A-B.

In general, each of the video player devices 106A-B includes a combination of hardware and/or software needed to receive, process, and play the video streams received from the streaming server 104. As examples, each of the video player devices 106A-B can be implemented to include a streaming application stored in memory and being executed by a suitable processor. As some specific examples, each of the video player devices 106A-B can be implemented with any suitable computing device, including laptops, tablets, virtual reality (VR) devices, and mobile communication devices (e.g., smart phones). Such devices may include an integrated display screen, or may be coupled to a separate display screen.

In one example embodiment, the video streaming system 100 is implemented to perform one or more automated processes during the streaming of video content from the streaming server 104 to the plurality of video player devices 106A-B. Examples of such an automated process are described below with reference to FIGS. 3A and 3B.

In accordance with the embodiments described herein the streaming system 100 is implemented to provide improved responsiveness from the perception of a user by reducing the delay that occurs between when a user acts to initiate video streaming and when the video content is transmitted, received and displayed at the video player devices 106A-B. In general, these embodiments reduce perceived delay by preloading video streaming content in response to detecting particular patterns of movement of the remote control 108. Specifically, these embodiments monitor for movement of the remote control 108 and determining if a detected movement corresponds to a likely initiation of video streaming. When such movements are detected, the embodiments begin preloading the video streaming content from the streaming server 104 to the video player device 106A-B Because this preloading occurs in response to detected movement of the remote control, this preloading can begin before a user acts to initiate video streaming (e.g., before a user presses specific button(s) on the remote control 108 to select content or otherwise initiate streaming). Because preloading is started early, the video stream can begin to be displayed earlier than it would be otherwise. Thus, the preloading in response to movement of the remote control can reduce the delay that otherwise would occur between the time when a user acts to initiate video streaming and when the video content is transmitted to the video player device 106A-B, received and displayed on a display screen.

In one example embodiment, an automated process is executable by a video player device 106A-B in communication with a streaming server 104 over a network 105. In such an embodiment the automated process comprises: monitoring to detect movement of a remote control 108 for a video device 106A-B; analyzing the detected movement of the remote control 108 to identify possible patterns of movement and likelihoods of the identified possible patterns of movement; determining if at least one of the identified possible patterns of movement that corresponds to an initiation of media streaming has a probability beyond a threshold level; and responsive to determining that at least one of the identified possible patterns of movement that corresponds to the initiation of media streaming has a probability beyond a threshold level, begin preloading of streaming video content at the video player device 106A-B.

In the embodiment illustrated in FIG. 1, the remote control 108 includes at least one accelerometer 109 for monitoring and detecting movements. For example, the monitoring and detecting of movement of the remote control 108 can be done using three orthogonally configured accelerometers 109. In such an embodiment each of the three accelerometers 109 provides a measure of movement in one of three orthogonal directions. In other embodiments the video player devices 106A-B can also include one or more cameras used to locate and detect movement of the remote control 108. In such an embodiment, the camera can also be used to detect movement of the control 108.

In either case, the detected movement can then be analyzed to identify possible patterns of movement and determine if at least one identified possible pattern of moment corresponds to movement associated with the initiation of video streaming. For example, the identified possible patterns of movement of the remote control 108 are analyzed to determine if the movement is associated with a user picking up the remote control and turning the remote control toward the video player device 106A-B. As such, this movement would be indicative of the initiation of video streaming, such that preloading of video streaming content should be performed.

A variety of techniques can be used to analyze the detected movement to identify possible patterns of movement and determine if at least one identified possible pattern of moment corresponds to movement associated with the initiation of video streaming. For example, detected movement can be analyzed using a neural network that has been implemented to analyze such detected movements and identify possible pattern of movements. Then it can be determined if at least one of the identified possible patterns of movement that corresponds to the initiation of video streaming has a probability beyond a threshold. Such an embodiment will be described in greater detail below.

When begin preloading of streaming video content at the video player device 106A-B, a variety of techniques can be used to identify and select the specific instance of video content that is preloaded. For example, in some embodiments the video content selected for preloading is the video content associated with the most recent video streaming to the video player device 106A-B. For example, the previously streaming on-demand video content can be restarted at the same point in the video content where streaming last ceased. Alternatively, the same channel or other live programming can be preloaded with the currently broadcasting content.

In some embodiments the preloaded video content is selected based at least in part on a user profile of a user of the video player device 106A-B. For example, a user profile can be utilized to identify programming last watched by the user and that previously watched content can be preloaded to restart streaming. Alternatively, a user profile can be utilized identify a new show or other programming of likely interest to the user and that new video content can be preloaded.

In one embodiment the remote control 108 can include a fingerprint sensor. The fingerprint sensor can be used to identify the user of the remote control, and thus can be used to select the correct user profile. In other embodiments the fingerprint sensor can be used to facilitate other features, such as unlocking the video player device.

Figure 2:
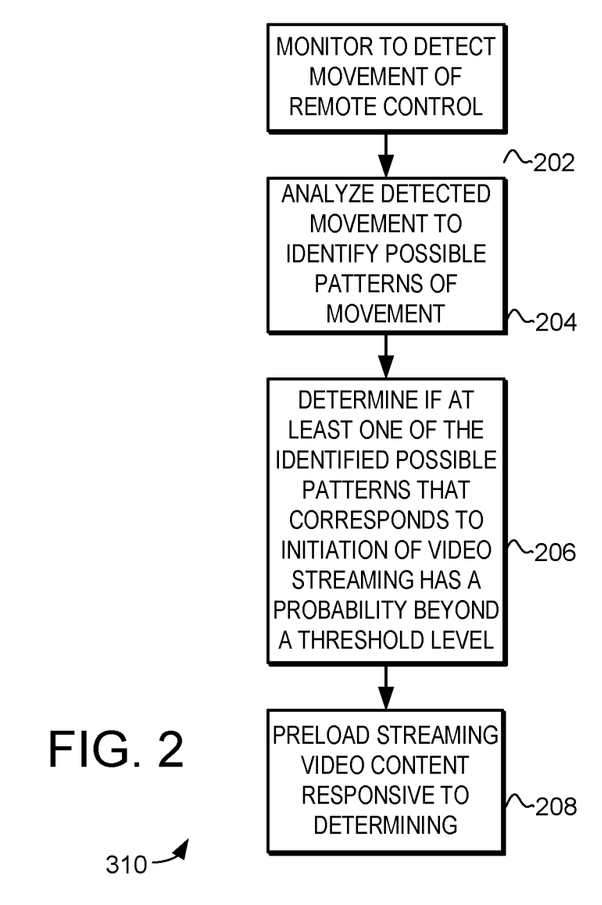
FIG. 2 is a flow diagram of an exemplary method in accordance with an embodiment.

Turning now to FIG. 2, a video streaming method 200 is illustrated. In general the video streaming method 200 is implemented in a video streaming system (e.g., video streaming system 100) to provide improved responsiveness from the perception of user by reducing the delay that occurs between when a user acts to initiate video streaming and when the video content is transmitted, received and displayed on a display screen. The video streaming method 200 reduces these delays by preloading video streaming content in response to detecting particular patterns of movement of a remote control.

The first step 202 in method 200 is monitoring to detect movement of a remote control (e.g., remote control 108). This step can be performed in a variety of ways and with a variety of different types of sensors. For example, in one embodiment the remote control is implemented to include one or more accelerometers that measure acceleration. Specifically, an array of three orthogonally configured accelerometers can be implemented on the remote control to measure acceleration in three orthogonal directions. So implemented the three accelerometers can provide measures of movement three orthogonal directions, and these measures of moments can be used to detect and analyze patterns of movement.

In other embodiments, different types of sensors can be used to monitor and detect movement of the remote control. For example, optical sensors can be used. In one example a camera can be used to track movement of the remote control. The camera can be included as part of the video player device. In other embodiments the camera can be a separate device that can be mounted in a variety of different locations. In one specific example embodiment, the camera is attached to the television or other display screen and used to monitor for movement of the remote control from that location. Such a camera can be used to determine when the remote control is turned to face the television and/or video player device in an action that corresponds to the initiation of video streaming.

Other examples of sensors that can be used to monitor and detect movement of the remote control include low intensity RADAR and LIDAR.

The next step 204 in method 200 is analyzing the detected movement to identify possible patterns of movement. In this step the data from the accelerometers or other sensors is analyzed to identify possible patterns of movement. Additionally, as part of step 204 the likelihood of each of the possible patterns of movement can be determined.

A variety of different techniques can be used to perform this analysis. In one embodiment, a neural network is implemented to recognize patterns of movement associated with a user picking up the remote control and turning the remote control toward the video player device in an action that is indicative of the desire to initiate video streaming. When trained with appropriate datasets such a neural network can be implemented to generate one or more probabilities that a detected movement corresponds to one or more patterns of movement that correspond the user initiating video streaming.

As one detailed example, a recurrent neural network can be implemented to receive multidimensional input data from a plurality of accelerometers and generate these probabilities based on that multidimensional input data. In other examples, a recurrent neural network can be implemented to receive multidimensional input data from a plurality of accelerometers and at least one optical sensor and generate these probabilities based on that multidimensional input data. In such an embodiment the optical sensor can be a camera that provides a large amount of pixel data that can also be provided as multidimensional input data to the neural network.

In each case the neural network can be implemented by training with appropriate data sets. For example, training can be achieved by recording initial samples (e.g., 10,000 samples of accelerometer data per pattern of movement) and using those initial samples for an initial training. After this initial training, additional training samples can be recorded and used for further supervised training to achieve a desired accuracy.

Thus, a trained neural network can be implemented to receive accelerometer and other sensor data and identify possible patterns of movement and generate one or more probabilities for the possible patterns of movement that correspond to the user initiating video streaming.

The next step 206 in method 200 is determining if at least one of the identified possible patterns of movement that corresponds to initiation of video streaming has a probability beyond a threshold level. In this step, the possible patterns of movement identified in step 204 are examined to determine if one that corresponds to remote control movement associated with the initiation of video streaming has a relatively high likelihood such that preloading of video content should be performed. In this step, the determined probability for each possible pattern of movement that corresponds to the initiation of video streaming can be compared to its own threshold level, or each probability can be compared to same threshold level.

The next step 208 in method 200 is preloading streaming video content responsive to determining that at least one of the identified possible patterns of movement that corresponds to the initiation of video streaming has a probability beyond the threshold level. In this step both video data and metadata related to video content can be preloaded from the streaming server to the video player device. In one example, the preloading can be performed using a REST API call to initiate a socket connection with the streaming server and cache at least 5-10 seconds of video data and metadata in the Active cache of the application under use.

Because this preloading occurs in response to detected movement of the remote control this preloading can begin before a user acts to initiate video streaming (e.g., before a user presses specific button(s) on the remote to initiate streaming). And as such, this preloading can reduce the delay that occurs between the time when a user acts to initiate video streaming and when the video content is transmitted, received and displayed on a display screen.

A variety of techniques can be used to identify and select the video content that is preloaded in step 208. For example, in some embodiments the video content most recently streamed is preloaded to restart streaming that same content. Specifically, on-demand video content can be preloaded to restart at the same point in the video content where streaming last ceased. Alternatively, the same channel or other live programming can be preloaded with the currently broadcasting content.

In some embodiments the video content preloaded in step 208 is selected based on a user profile. In this case, the user profile can be utilized to identify programming last watched to identify a new show or other programming of likely interest to the user and that new video content can be preloaded.

Figure 3A:
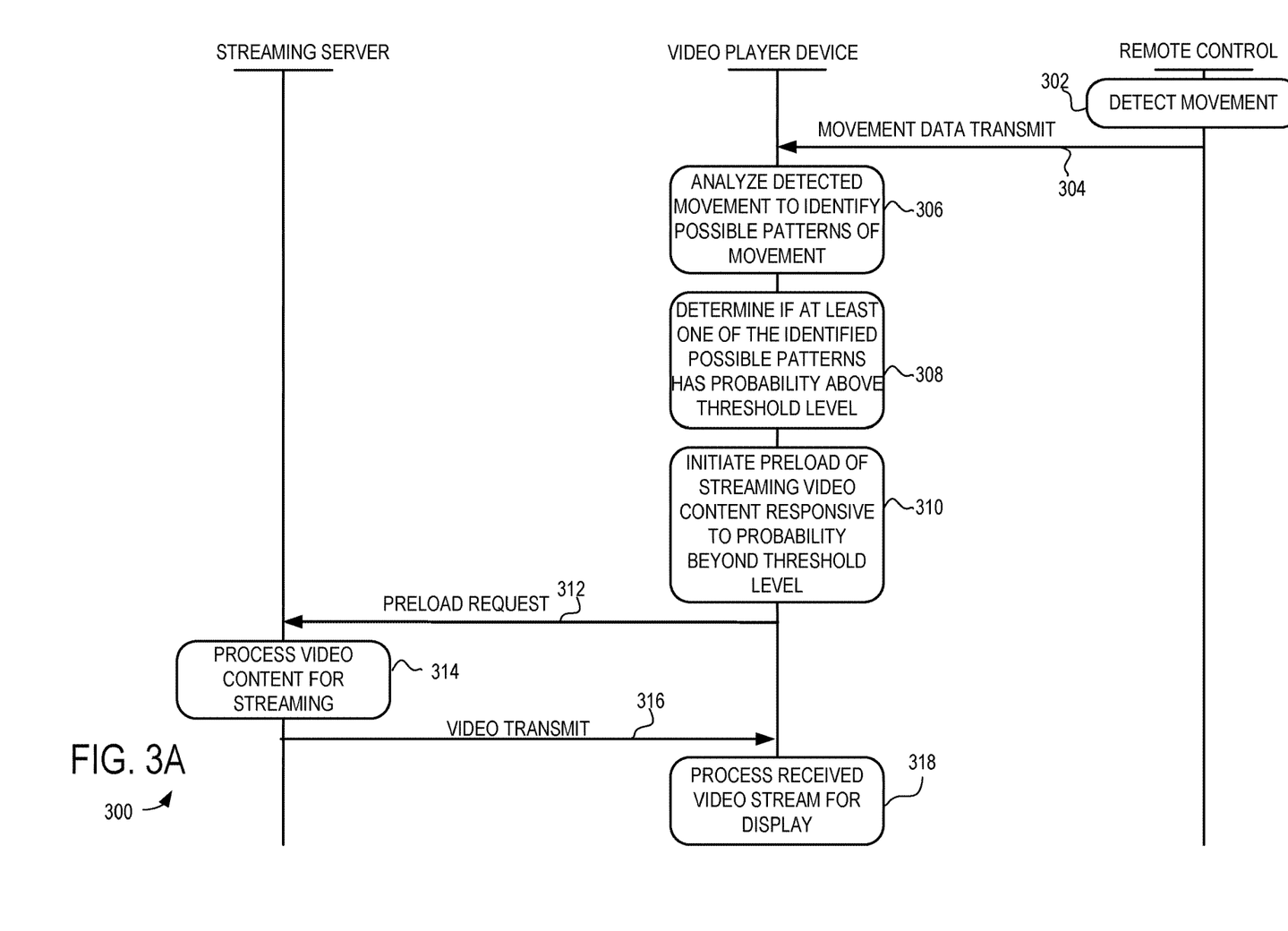
FIGS. 3A and 3B are process flow diagrams showing various processes executable by various devices in a streaming media system schematic views of a user interface in accordance with various embodiments.

Turning now to FIG. 3A, a process flow 300 illustrates various example processes and data flows that can be automatically executed by a streaming server (e.g., streaming server 104) in a video streaming system (e.g., video streaming system 100) that includes one or more video player devices (e.g., video player devices 106A-B). Specifically, the process flow 300 illustrates a process flow between an exemplary streaming server and an exemplary video player device that monitors to detect movement of a remote control (e.g., remote control 108) with one or more sensors (e.g., accelerometer 109). The process flow 300 can be implemented to provide improved responsiveness from the perception of user by reducing the delay that occurs between when a user acts to initiate video streaming and when the video content is transmitted, received and displayed on a display screen associated with the video player device.

To facilitate the process flow 300, communications between the various devices can be initiated and established in any suitable manner. For example, communication between the various devices and networks may be established using Internet or other protocols that can include both wireless networking systems (e.g., Wi-Fi) or wired networking systems (e.g., Ethernet or HDMI). Additionally, short range wireless communication techniques (e.g., near field communication, infrared, Bluetooth™) can be used to facilitate communication between the remote control and the video player device.

At process step 302 movement of the remote control is detected. The movement of the remote control can be detected in a variety of ways and with a variety of different types of sensors. In one embodiment, process step 302 is performed with an array of three orthogonally configured accelerometers implemented on the remote control. Such orthogonally configured accelerometers can be implemented on the remote control to measure acceleration in three orthogonal directions.

At movement data transmit step 304 the remote control transmits movement data to the video player device. This movement data can be transmitted using any suitable technique and in any suitable format. For example, the movement data for three orthogonal directions can be formatted as three dimensional data with an additional time component and transmitted to the video player device using Bluetooth® or other suitable wireless communication.

At process step 306 the detected movement data is analyzed to identify possible patterns of movement. In this step the data from the accelerometers or other sensors is analyzed to identify possible patterns of movement. In one embodiment, this analysis is performed with a neural network implemented on the video player device. When implemented, such a neural network can generate one or more probabilities that a detected movement corresponds to one or more patterns of movement that correspond the user initiating video streaming.

At process step 308 it is determined if at least one of the identified possible patterns of movement that corresponds to initiation of video streaming has a probability beyond a threshold level. In this processing step the probabilities of the possible patterns are examined to determine if one that corresponds to remote control movement associated with the initiation of video streaming has a relatively high likelihood. Specifically, the determined probability for each possible pattern of movement that corresponds to the initiation of video streaming can be compared to the threshold level to determine which, if any are sufficiently likely to initiate preloading of video content.

At process step 310, the preloading of streaming video content is initiated responsive to determining that at least one of the identified possible patterns of movement that corresponds to the initiation of video streaming has a probability beyond the threshold level. In this step if at least one generated probability is beyond the threshold the preloading is performed, while preloading is not performed otherwise. To initiate this preloading of video content a preload request step 312 transmits a preload request to the streaming server.

At process step 314 the streaming server initiates a streaming video session and begins transmitting a video content to the video player device using video transmit function 516. Process step 512 and video transmit function 516 can include the encoding and transmitting of the preloaded video content from any suitable content source. Additionally, such processing and transmitting can include transmitting using any suitable technique or protocol. As one detailed example, the streaming server can transmit an encoded video stream via a content delivery network for distribution the Internet as part of an RSDVR, VOD or other video streaming service. In these and other such embodiments these videos streams are thus received at the video player devices as input video streams.

At process step 318, the video player device processes the received input video streams of the program channel for display on the video player device. In this process step a streaming application and/or operating system and/or specialized hardware on the video player device performs typical video processing tasks associated with the receiving and displaying of video. For example, these elements can perform various decoding and rendering functions as needed to display the program channel on a video display device.

In the process flow 300 the preloading of video content occurs in response to detected movement of the remote control, and thus this preloading can begin before a user acts to initiate video streaming (e.g., before a user presses specific button(s) on the remote control to select content or otherwise initiate streaming). Because preloading is started early, the video stream can begin to be displayed at process step 318 earlier than it would be otherwise. Thus, the preloading in response to movement of the remote control can reduce the delay that otherwise would occur between the time when a user acts to initiate video streaming and when the video content is transmitted to the video player device, received and displayed on a display screen.

Figure 3B:
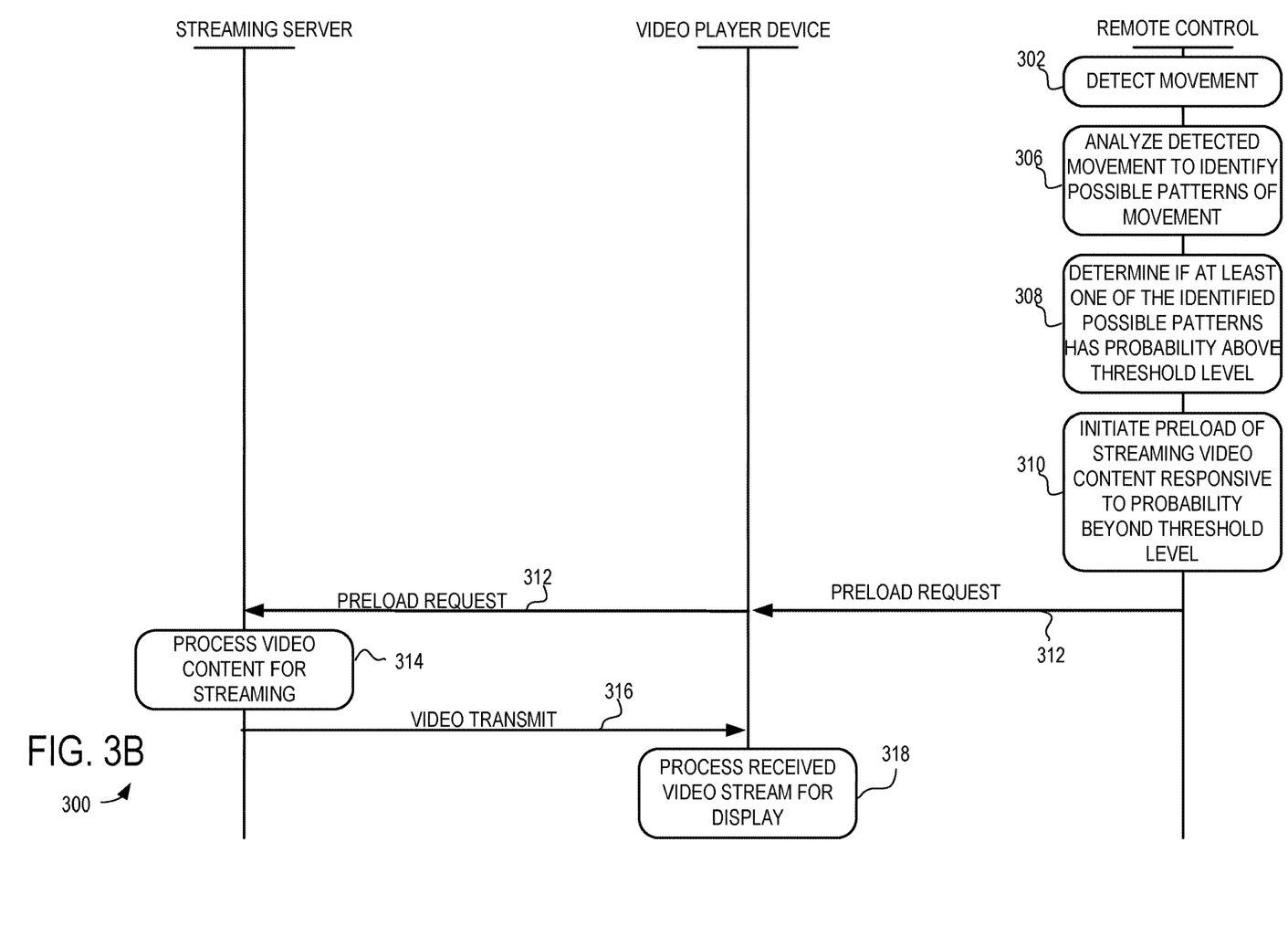

It should be noted that the process flow 300 is just one example, and that other implementations are possible. Turning now to FIG. 3B, a process flow 350 illustrates another example of and data flows that can be automatically executed by a streaming server (e.g., streaming server 104) in a video streaming system (e.g., video streaming system 100) that includes one or more video player devices (e.g., video player devices 106A-B). Again, the process flow 350 illustrates a process flow between an exemplary streaming server and an exemplary video player device that monitors to detect movement of a remote control (e.g., remote control 108) with one or more sensors (e.g., accelerometer 109). The process flow 350 differs from process flow 300 in that movement data is not transmitted to the video player device and instead process steps 306, 308 and 310 are performed on the remote control. Then, as remote control movements are detected, the preload request 312 is transmitted from the remote control to the video player device and finally to the streaming server.

Thus, the process flow 350 is more suited to implementations where the remote control includes sufficient processing capability to analyze detected movements and determine probabilities of possible movement patterns. For example, by implementing a neural network on the remote control.

Figure 4:
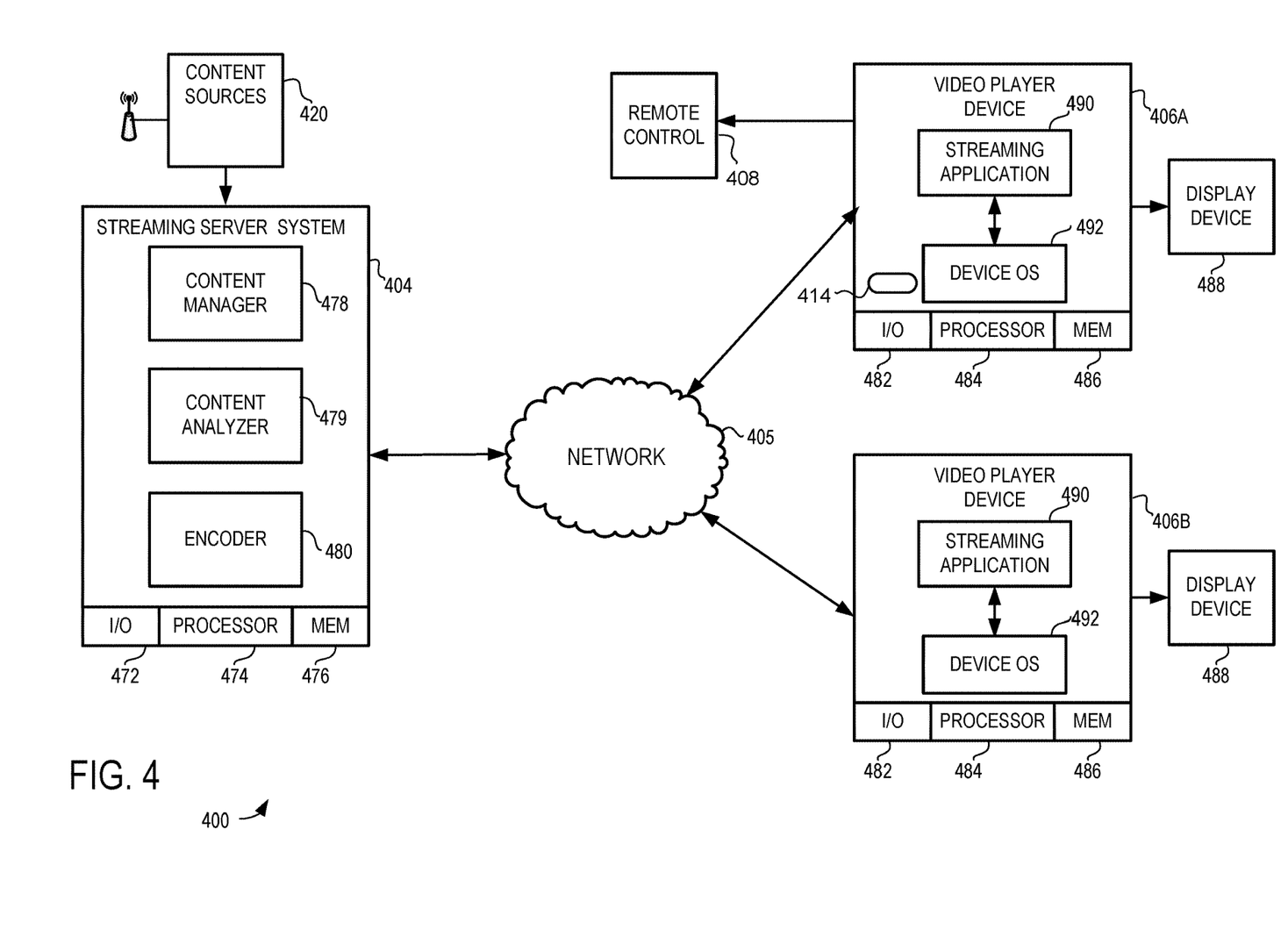
FIG. 4 is a detailed diagram of one example implementation of a streaming media system.

Turning now to FIG. 4, a video streaming system 400 suitably includes a streaming server system 404, a plurality of video player devices 406A-B and a remote control 408. In general, the streaming server system 404 receives video content from one or more content sources 420, and transmits that video content through the network 405 to the video player devices 406A-B in the form of a video stream that can be received, processed, and displayed at the video player devices 406A-B. The video streaming system 400 is an example of the type of system that can be implemented to reduce perceived delay by preloading video streaming content in response to detecting particular patterns of movement of the remote control. For example, the video streaming system 400 can be used to implement the process flow illustrated in the process flow 300 and 350 of FIGS. 3A and 3B.

In general, the content sources 420 can be any type of video content source, including media providers, content aggregators or distributors such as a cable television system operator, a direct broadcast satellite (DBS) system operator, or simply a network service provider or the like. The streaming server system 404 processes the received content into a suitable format streaming to the video player devices 406A-B. To facilitate this, the streaming server system 404 includes at least an I/O 472, a processor 474, and a memory 476. Additionally, the streaming server system 404 includes a content manager 478, a content analyzer 479, and an encoder 480.

In general, each of the video player devices 406A-B includes a combination of hardware and/or software needed to receive, process, and play the video streams received from the streaming server system 404. For example, each of the video player devices includes an I/O 482, a processor 484, a memory 486, and a display device 488. Furthermore, each of the video player devices 406A-B includes a streaming application 490 and a device OS 492 residing in memory 486 and being executed by the processor 484. As some specific examples, each of the video player devices 406A-B can be implemented with any suitable computing device. Such devices may include an integrated display device 488, or may be coupled to a separate display device 488. Additionally, in some embodiments the video player devices 406A-B can include one or more optical sensors (e.g., camera 414).

In accordance with the embodiments described herein the video streaming system 400 is implemented to monitor for movement of the remote control 408 and determine if a detected movement corresponds to a likely initiation of video streaming. When such movements are detected, the embodiments begin preloading the video streaming content from the streaming server system 404 to the video player device 406A-B Because this preloading occurs in response to detected movement of the remote control, this preloading can begin before a user acts to initiate video streaming and thus can reduce the delay that otherwise would occur between the time when a user acts to initiate video streaming and when the video content is transmitted to the video player device 406A-B, received and displayed on a display device 488.

Figure 5:
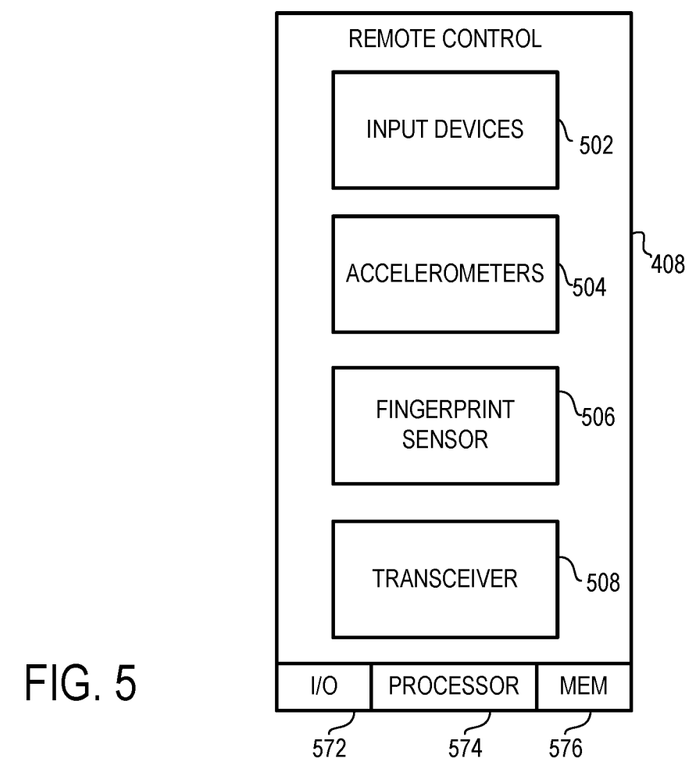
FIG. 5 is a detailed diagram of one example implementation of a remote control.

To facilitate this, the remote control 408 can include a variety of sensors and other elements. Turning briefly to FIG. 5, a detailed example of the remote control 408 is illustrated schematically. In general, the remote control 408 includes a combination of hardware and/or software needed to control the operation of the video player devices 406A-B. Additionally, in accordance with the various embodiments described herein, the remote control 408 can include the combination of hardware and/or software needed to detect movement of the remote control 408, transmit movement data, analyze detected movements, determine probabilities of possible movement patterns and/or transmit preload requests. To facilitate this, the remote control 408 includes an I/O 572, a processor 574, and a memory 576. Furthermore, the remote control includes input devices 502, accelerometer(s) 504, fingerprint sensor 506, and transceiver 508.

The input devices 502 can include buttons, switches, touch sensors and other such devices to receive user input from the user. The accelerometers 504 can include an array orthogonally configured accelerometers. In such an embodiment the accelerometers 504 provide measures of movement in the orthogonal directions. The fingerprint sensor 506 can include any suitable type of sensor to detect a user finger and identify the user based on the fingerprint. Finally, the transceiver 508 can comprise any suitable receiver/transmitter configured to communicate with the video player devices 406A-B.

Returning to FIG. 4, the content sources 420 can include content from a content aggregator or distributor such as a cable television system operator, a direct broadcast satellite (DBS) system operator, a streaming media provider, or simply a network service provider or the like. Other embodiments could provide the features described herein using conventional computing machinery (e.g., physical or cloud based servers) by parties that may or may not be interested in re-distributing the received content, as desired.

In various embodiments, television signals for one or more networks, channels or the like are received in any format by the system operator via satellite, fiber optic or any other conventional wireless or physical media for transmitting television signals. The signals are received, demodulated and decoded as needed by any appropriate receiver(s) to extract program signals that represent the decoded television program stream. Alternately or additionally, content sources 420 may receive content directly from a broadcaster, distributor or other source, as desired.

In a typical embodiment the received programming signals are analyzed as appropriate to identify the program contents. For example, the content analyzer 479 can be implemented to analyze audio and/or video content in the programming signals. Such a system can be used to recognize advertisements (e.g., commercials) or other portions of the underlying content. In a typical embodiment, the content analyzer 479 executes a software application that performs the analysis based upon the audio and/or video content received. In various embodiments, content analyzer 479 may consider average zero crossing rate, average spectrum, spectral flatness, prominent tones across a set of frequency bands, bandwidth and/or any other characteristics of the audio or video signal. Other embodiments could equivalently perform a temporal analysis in addition to or in place of frequency analysis. Such a temporal analysis could, for example, identify peak (or peak RMS) values in the time domain signal to find beats (e.g., in music) or other times between peak values that can uniquely identify the content. This temporal analysis could be combined into a fingerprint or signature in any way, or could be considered separately from other factors. Many different audio and video fingerprinting or other automated analysis programs could be used in any number of other embodiments.

The extracted content data may be compared to data previously stored in a database, as appropriate, to identify portions of content in the program stream. Commercials, for example, can be recognized when the audio portions of the program stream contain similar data to known audio data stored in a database. Such a database may make use of conventional database software, or the database may be a custom database developed to store content recognition data, as desired. Such a database may reside on the same computing hardware as the streaming server system 404, or separate computing resources could be provided, including any sort of cloud-based computing resources.

In one specific embodiment, the content analyzer 479 is configured to recognize scene changes in the underlying content. When a different scene is identified in the content analyzer 479 attempts to recognize the scene based upon digital analysis of the audio and/or video. If the scene already exists in the database, then a new occurrence of the recognized scene can be recorded in the database or elsewhere. If the scene is not recognized, then a new entry in the database may be created to identify subsequent occurrences of the same scene. To that end, a digital "signature" or "fingerprint" of the scene is stored for subsequent analysis. Content may be initially recognized based upon information supplied by human data entry (e.g., crowdsourced data, or data entered by a technician), or by data supplied by a content source (e.g., an advertiser, broadcaster or network), and/or from any other source as desired. Content analyzer 479 is therefore able to identify advertisements or other contents of the received television broadcasts and other video though analysis of the underlying audio or video content.

In many implementations, content identification is performed by the content analyzer 479 in parallel for multiple channels that may be simultaneously received for content aggregation, for collection of advertising data, or for any other purpose. A distributor/aggregator, for example, may encode the extracted signals for distribution on a digital network, for aggregation and redistribution of signals over a DBS or cable distribution system, for generating content stored on a RSDVR or VOD service, or for any other purpose. Content identification could be performed while the content is being processed for redistribution. Alternately, content could be stored for subsequent analysis, as desired.

In some embodiments the content analyzer 479 can perform content analysis in parallel with the encoding provided by the encoder 480. The encoder 480 can encode live broadcast signals and other such video content for adaptive streaming on the network 405 and/or for broadcast via cable, direct broadcast satellite, terrestrial broadcast, and/or the like. Encoder 480, for example, can be used to encode signals into a suitable format for broadcast via cable, DBS, or the like. Such broadcasts may be ultimately received by video player devices 406A-B via the network 405 or the like. In one specific example, the encoder 480 suitably encodes programs contained within signals from the content sources 420 into one or more adaptive streams that each representing a media program in its entirety, but with different bit rates, frame rates, resolution and/or other levels of quality. Typically, each stream is made up of smaller segments that each represent a small portion of the program content with a single data file. Each stream is typically encoded so that segments of the different streams are interchangeable with each other, often using a common timing index. This allows a client video player devices 406A-B to mix and match segments from different streams to create a media stream that effectively adapts as network conditions or other conditions change. Since the segments are typically stored as separate files, segment requests may take the form of conventional hypertext transport protocol (HTTP) constructs (e.g., HTTP "get" instructions) or the like. Such constructs are readily routable on network 405 and can be served by conventional CDN or other web-type servers, thereby providing a convenient mechanism for distributing adaptive media streams to a variety of different client devices on network 405.

Again, other embodiments may use different encoders for the encoder 480. Still other embodiments may omit the encoding function entirely and perform audio analysis or other content recognition separately from the distribution function. Since many distributors already receive program signals for encoding, there may be an economy of scale in performing the content recognition function at the same time. Other embodiments could nevertheless use different encoding or streaming structures or techniques, as desired, or content could be equivalently aggregated and/or broadcast via satellite, cable, terrestrial broadcast, non-adaptive media stream and/or the like. As noted above, it is not necessary that the analyzed content be re-broadcast or re-distributed by the analyzing party in all embodiments. It may be sufficient for many purposes to simply gather data for recognizing advertisements or other portions of the content, for analyzing or further processing information about the recognized advertisements and/or for taking other actions as desired without necessarily re-broadcasting or redistributing the content itself.

Content manager 478 is provided to manage and distribute electronic program guide (EPG) data and other information about the programs that are distributed within streaming server system 404. The content manager 478 may also be implemented to process information relating to advertisements or other portions of the content stream, to associate actions to be performed by the viewer and/or the playback device based upon the content of the stream, and/or for any other purpose.

The data maintained by the content manager 478 could include channel information and timing information about each entry so that the particular content can be readily identified. Other embodiments may use different identification data, such as distributor or network information, or any other information as desired. Some implementations may incorporate conventional EPG data (e.g., data obtained from a vendor or other source), while other implementations may use channel and time so that even portions of a program can be individually identified. Commercials and other advertisements, for example, could be referenced by their channel and broadcast time so that additional actions unique to those advertisements could be enabled. Other embodiments could use different timing references (e.g., references to MPEG presentation time stamps (PTS) in the underlying content, references to event anchors in the content itself, and/or any other timing references) as desired.

In various embodiments, data including information obtained from the content analysis is provided to the video player devices 406A-B. This data could be formatted in any manner. In various embodiments, data could include action data and/or identification data as tags or the like in an XML-type format. Again, many other embodiments could incorporate any number of additional or alternate features to take advantage of the real-time identification feature provided by the broadcaster.

The various concepts and examples described herein may be modified in any number of different ways to implement equivalent functions and structures in different settings. The term "exemplary" is used herein to represent one example, instance or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. A video streaming method performed by a video player device in communication with a remote control, the video streaming method comprising:
   detecting, by a sensor, a movement of the remote control;
   analyzing the detected movement of the remote control to identify one or more possible patterns of movement of the remote control;
   determining if at least one of the one or more identified possible patterns of movement corresponds to an initiation of streaming of a video content;
   responsive to determining that at least one of the identified possible patterns of movement corresponds to the initiation of streaming of the video content and prior to receiving a subsequent command from the remote control to initiate streaming of the video content, beginning preloading of the video content by at least partially filling a playback buffer of the video player device; and
   upon receipt of the subsequent command to initiate streaming of the video content, providing the preloaded video content from the playback buffer for immediate playback of the video content.

2. The video streaming method of claim 1, wherein:
   the remote control comprises the sensor;
   detecting the movement of the remote control comprises receiving, from the remote control, a movement data based on a measurement from the sensor; and
   analyzing the detected movement comprises analyzing the received movement data.

3. The video streaming method of claim 1, wherein the sensor comprises an optical sensor coupled with the video player device and wherein detecting the movement of the remote control comprises processing a pixel output obtained from the optical sensor.

4. The video streaming method of claim 1, wherein analyzing the detected movement is performed with a neural network.

5. The video streaming method of claim 1, wherein a possible pattern of movement that corresponds to an initiation of streaming of the video content comprises movement associated with a user picking up the remote control and turning the remote control toward the video player device.

6. The video streaming method of claim 5, wherein determining if at least one of the one or more identified possible patterns of movement corresponds to initiation of streaming of the video content comprises determining, for each of the one or more identified patterns of movement, a likelihood that the identified pattern of movement corresponds to initiation of streaming of the video content.

7. The video streaming method of claim 6, wherein determining that at least one of the identified possible patterns of movement corresponds to the initiation of streaming of the video content comprises determining that at least one of the one or more determined likelihoods is above a threshold.

8. The video streaming method of claim 1, wherein the video content comprises a video data and a meta data.

9. The video streaming method of claim 1 wherein the preloading of the video content comprises preloading a recently streamed video content.

10. The video streaming method of claim 1, wherein the preloading of the video content comprises selecting the video content for preloading based on a user profile of a user of the video player device.

11. A video player device configured to communicate with a streaming server over a network and a remote control, the video player device comprising a processor and a memory, wherein the processor is configured to perform an automated process by executing digital instructions stored in the memory, wherein the automated process comprises:
   detecting, by a sensor, a movement of the remote control;
   analyzing the detected movement of the remote control to identify one or more possible patterns of movement of the remote control;
   determining if at least one of the one or more identified possible patterns of movement corresponds to an initiation of streaming of a video content;
   responsive to determining that at least one of the identified possible patterns of movement corresponds to the initiation of streaming of the video content and prior to receiving a subsequent command from the remote control to initiate streaming of the video content, beginning preloading of the video content by at least partially filling a playback buffer of the video player device; and
   upon receipt of the subsequent command to initiate streaming of the video content, providing the preloaded video content from the playback buffer for immediate playback of the video content.

12. The video player device of claim 11, wherein the sensor comprises at least one selected from the group of an accelerometer, an optical sensor, a LIDAR sensor, and a RADAR sensor.

13. The video player device of claim 11, wherein:
   the remote control comprises the sensor;
   detecting the movement of the remote control comprises receiving, from the remote control, a movement data based on a measurement from the sensor; and
   analyzing the detected movement comprises analyzing the received movement data.

14. The video player device of claim 11, wherein the sensor comprises an optical sensor coupled with the video player device and wherein detecting the movement of the remote control comprises processing a pixel output obtained from the optical sensor.

15. The video player device of claim 11, wherein analyzing the detected movement is performed with a neural network.

16. The video player device of claim 11, wherein a possible pattern of movement that corresponds to an initiation of streaming of the video content comprises movement associated with a user picking up the remote control and turning the remote control toward the video player device.

17. The video player device of claim 16, wherein determining if at least one of the one or more identified possible patterns of movement corresponds to initiation of streaming of the video content comprises determining, for each of the one or more identified patterns of movement, a likelihood that the identified pattern of movement corresponds to initiation of streaming of the video content.

18. The video player device of claim 17, wherein determining that at least one of the identified possible patterns of movement corresponds to the initiation of streaming of the video content comprises determining that at least one of the one or more determined likelihoods is above a threshold.

19. The video player device of claim 11, wherein the video content comprises a video data and a meta data.

20. The video player device of claim 11, wherein the preloading of the video content comprises preloading a recently streamed video content.

* * * * *